(12) United States Patent
Deloatch

(10) Patent No.: US 8,478,340 B1
(45) Date of Patent: Jul. 2, 2013

(54) DEVICE FOR AND METHOD OF DETECTING SIM CARD REMOVAL AND REINSERTION

(75) Inventor: Daryle D. Deloatch, Odenton, MD (US)

(73) Assignee: The United States of America as Represented by the Director, National Security Agency, Washington, DC (US)

( * ) Notice: Subject to any disclaimer, the term of this patent is extended or adjusted under 35 U.S.C. 154(b) by 29 days.

(21) Appl. No.: 13/374,642

(22) Filed: Dec. 14, 2011

(51) Int. Cl.
*H04M 1/00* (2006.01)

(52) U.S. Cl.
USPC .......................... 455/558; 455/411; 455/552.1

(58) Field of Classification Search
USPC ....................... 455/411, 558, 552.1
See application file for complete search history.

(56) References Cited

U.S. PATENT DOCUMENTS

| 7,369,851 | B2 | 5/2008 | Okonnen et al. | |
|---|---|---|---|---|
| 7,689,251 | B2 | 3/2010 | Bae | |
| 7,747,997 | B1 | 6/2010 | Rao | |
| 7,840,234 | B2 | 11/2010 | Chan | |
| 2008/0032743 | A1* | 2/2008 | Lee | 455/558 |
| 2008/0220743 | A1* | 9/2008 | Mora et al. | 455/411 |

* cited by examiner

*Primary Examiner* — Christian Hannon
(74) *Attorney, Agent, or Firm* — Robert D. Morelli

(57) ABSTRACT

A device for and method of determining if a SIM card was removed and reinserted into a device by initially inserting the SIM card into the device, checking for the presence of the SIM card, if the SIM card is present then returning to the second step, if the SIM card is not present then reporting that the SIM card has been removed from the user-definable electronic device, checking for the presence of the SIM card, if the SIM card is not present then returning to the fifth step, and if the SIM card is present then reporting that the SIM card has been reinserted into the device, and returning to the second step.

7 Claims, 2 Drawing Sheets

US 8,478,340 B1

DEVICE FOR AND METHOD OF DETECTING SIM CARD REMOVAL AND REINSERTION

FIELD OF INVENTION

The present invention relates, in general, to information security and, in particular, to intrusion detection.

BACKGROUND OF THE INVENTION

A subscriber identity/identification module, which is commonly referred to as a SIM card, is a removable electronic component that stores information that identifies an authorized user of an electronic device (e.g., computer, mobile phone, etc.). Methods exist for identifying when an unauthorized user attempts to use someone else's electronic device using the unauthorized user's SIM card. For example, if a an electronic device associated to an original SIM card is stolen and a different SIM card is inserted into the device and the device is activated then information from the different SIM card would be sent to the company that associates the device to the original SIM card. However, there is a need to detect misuse of a valid SIM card with an electronic device for which the SIM card was intended to be used. The present invention is such a device and method.

U.S. Pat. No. 7,369,851, entitled "COMMUNICATIONS NETWORK CAPABLE OF DETERMINING SIM CARD CHANGES IN ELECTRONIC DEVICES," discloses a device for detecting and acting on a change in information stored on a SIM card (i.e., determine updates to firmware, software, configuration necessitated by the change in the SIM card and selectively communicates it to the electronic device). U.S. Pat. No. 7,369,851 is hereby incorporated by reference into the specification of the present invention.

U.S. Pat. No. 7,689,251, entitled "APPARATUS AND METHOD FOR CONTROLLING USE OF A SIM CARD OF A MOBILE TERMINAL," discloses a device for and method of that employs fraud technology to compare data related to the SIM card received from a network to information read from the SIM card in a terminal as part of a terminal initialization process and generating a signal to either enable or disable a SIM card function. U.S. Pat. No. 7,689,251 is hereby incorporated by reference into the specification of the present invention.

U.S. Pat. No. 7,747,997, entitled "FIRMWARE UPDATE IN ELECTRONIC DEVICES EMPLOYING SIM CARD FOR SAVING METADATA INFORMATION," discloses a device for and method of saving metadata related to firmware/software updates in a SIM card. U.S. Pat. No. 7,747,997 is hereby incorporated by reference into the specification of the present invention.

U.S. Pat. No. 7,840,234, entitled "METHOD AND MOBILE COMMUNICATION DEVICE CAPABLE OF RESUMING OPERATING FUNCTION OF TEMPORARILY DISABLED SIM CARD," discloses a method of resuming operation of a temporarily disabled SIM card. U.S. Pat. No. 7,840,234 is hereby incorporated by reference into the specification of the present invention.

SUMMARY OF THE INVENTION

It is an object of the present invention to detect removal from and re-insertion into an electronic device of a subscriber identity module (SIM) card.

The present invention is a device for and method of detecting removal from and re-insertion into a user-definable electronic device of a subscriber identity module (SIM) card.

The device includes a user-definable electronic device with a connector for receiving a SIM card.

The device also includes a first function block in the user-definable electronic device for determining when a SIM card is initially inserted into the user-definable electronic device.

The device also includes a second function block in the user-definable electronic device for determining when the SIM card has been removed from the user-definable electronic device.

The device also includes a third function block in the user-definable electronic device for determining when the SIM card has been reinserted into the user-definable electronic device.

The first step of the method is initially inserting a SIM card into a user-definable electronic device.

The second step of the method is checking for the presence of the SIM card in the user-definable electronic device.

The third step of the method is if the SIM card is present in the user-definable electronic device then returning to the second step.

The fourth step of the method is if the SIM card is not present in the user-definable electronic device then reporting via the user-definable electronic device to a user of the user-definable electronic device that the SIM card has been removed from the user-definable electronic device.

The fifth step of the method is checking for the presence of the SIM card in the user-definable electronic device.

The sixth step of the method is if the SIM card is not present in the user-definable electronic device then returning to the fifth step.

The seventh step of the method is if the SIM card is present in the user-definable electronic device and then reporting via the user-definable electronic device to a user of the user-definable electronic device that the SIM card has been re-inserted into the user-definable electronic device, and returning to the second step.

DETAILED DESCRIPTION

The present invention is a device for and method of determining when a Subscriber Identity Module (SIM) card has been removed from a user-definable electronic device (e.g., a computer, a mobile phone, etc.) and re-inserted into the user-definable electronic device. Prior art methods exist for determining and reporting when a SIM card not associated with an electronic device has been used in the electronic device, because that might indicate that some illegal activity has taken place (e.g., a thief steals a mobile phone, cannot operate it with the SIM card associated with the mobile phone, and uses his own SIM card to operate the mobile phone). However, no illegal activity is suspected when a SIM card associated with an electronic device is removed and re-inserted into an electronic device. However, illegal activity can occur in this situation. For example, if a user leaves an electronic device with his SIM card inserted therein unattended on a desk in a library while he searches for a book, there should be no reason for his SIM card to have been removed from the electronic device and reinserted therein while he was searching for the book. If the SIM card was so removed and reinserted then the SIM card and/or the electronic device may have been tampered with (e.g., data removed from the SIM card and/or electronic device or malicious software inserted into the SIM card and/or electronic device). The present invention detects the removal and re-insertion of a SIM card associated with an electronic device and reports such removal and re-insertion to the user so that the user may determine whether malicious activity has taken place (e.g., someone other than the owner of the SIM card or another authorized person removed and re-inserted the SIM card) and take any necessary corrective action (e.g., check for stolen data or malicious software). Without such a device and method, a user would not be alerted than an unknown person had tampered with the user's SIM card and/or electronic device.

Figure 1:
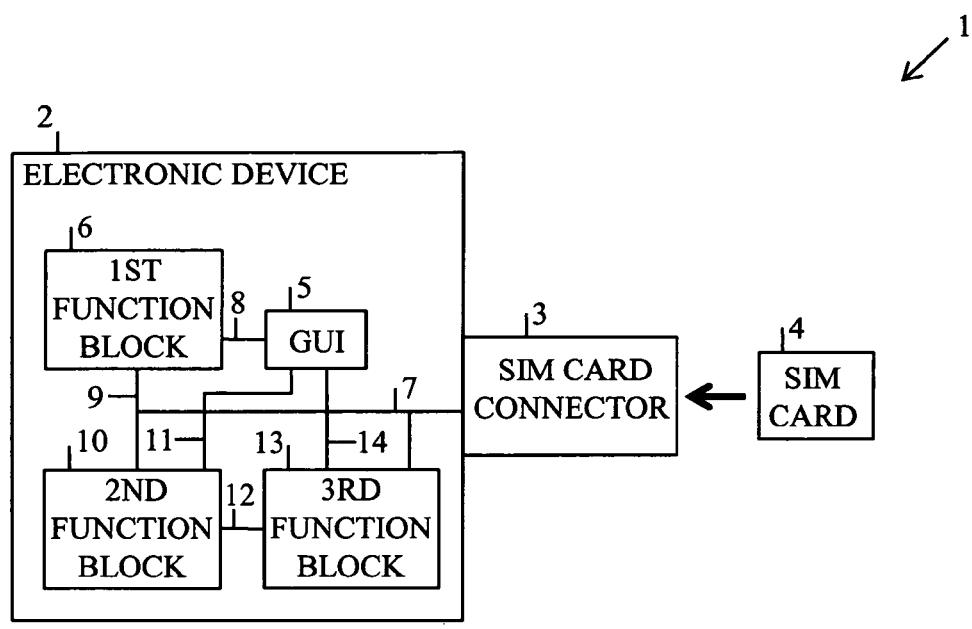
FIG. 1 is a schematic of the device of the present invention.

FIG. 1 is a schematic of a device 1 of the present invention.

The device 1 includes a user-definable electronic device 2, having a connector 3 for receiving a Subscriber Identity Module (SIM) card 4, and having a graphical user interface (GUI) 5. The user-definable electronic device is selected from the group of electronic devices consisting of a computer, a mobile phone, and a camera.

The device 1 includes a first function block 6 in the user-definable electronic device 2 for determining when a SIM card 4 is initially inserted into the SIM card connector 3, having an input 7 connected to the SIM card connector 3, having a first output 8 connected to the GUI 5, and having a second output 9. A user may define what "initially inserted" means (e.g., the first time ever, the first time within a user-definable period such as the first time today, the first time within the last n hours, etc.). In the preferred embodiment, detecting when a SIM card 4 has been initially inserted into the SIM card connector 3 is comprised of a SIM card insertion detection method selected from the group of SIM card insertion detection methods comprising initially and successfully communicating from the device 1 to the SIM card 4, initially and successfully communicating from the SIM card 4 to the device 1, and verifying via an Application Programming Interface (API) that an indicator (i.e., a flag) in software in the device 1 indicates (e.g., is set to 1) that a SIM card 4 is present in the SIM card connector 3.

The device 1 includes a second function block 10 in the user-definable electronic device 2 for determining when the SIM card has been removed from the SIM card connector 3, having a first input connected to the first input 7 of the first function block 6, having a second input connected to the second output 9 of the first function block 6, having a first output 11 connected to the GUI 5, and having a second output 12. A user may define what "initially inserted" means (e.g., the first time ever, the first time within a user-definable period such as the first time today, the first time within the last n hours, etc.). In the preferred embodiment, detecting when a SIM card 4 has been removed from the SIM card connector 3 is comprised of a SIM card removal detection method selected from the group of SIM card removal detection methods comprising unsuccessfully communicating from the device 1 to the SIM card 4, unsuccessfully communicating from the SIM card 4 to the device 1, and verifying via an API that a flag in software in the device 1 indicates (e.g., is set to 0) that a SIM card 4 is not present in the SIM card connector 3.

The device 1 includes a third function block 13 in the user-definable electronic device 2 for determining when the SIM card has been reinserted into the SIM card connector 3, having a first input connected to the first input 7 of the first function block 6, having a second input connected to the second output 12 of the second function block 9, and having an output 14 connected to the GUI 5. In the preferred embodiment, the third function block 13 sends a message to the GUI 5 to alert the user of the electronic device 2 that the SIM card had been removed and reinserted. In an alternate device, the third function block 13 also sends a message to a remote device (e.g., a computer, a phone, a personal digital assistant, etc.) to alert another (e.g., a monitor) that the SIM card was removed and reinserted. In the preferred embodiment, detecting when a SIM card 4 has been reinserted into the SIM card connector 3 is comprised of a SIM card reinsertion detection method selected from the group of SIM card reinsertion detection methods comprising successfully communicating from the device 1 to the SIM card 4, successfully communicating from the SIM card 4 to the device 1, and verifying via an API that a flag in software in the device 1 indicates (e.g., is set to 1) that a SIM card 4 is present in the SIM card connector 3.

Figure 2:
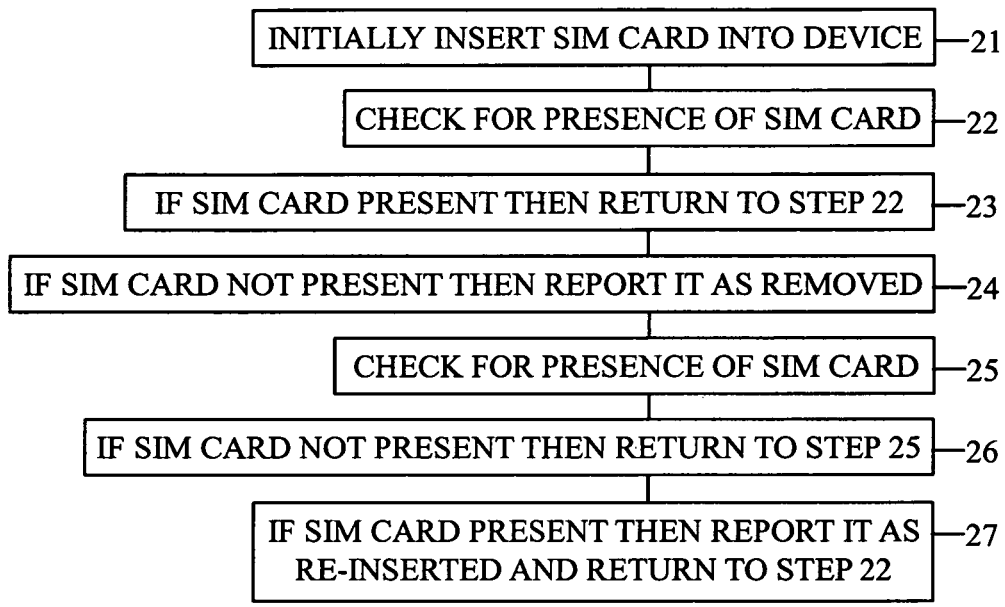
FIG. 2 is a flow-chart of the method of the present invention.

FIG. 2 is a flow-chart of the method of the present invention.

The first step 21 of the method is initially inserting a SIM card into a user-definable electronic device. The user-definable electronic device is selected from the group of electronic devices consisting of a computer, a mobile phone, personal digital assistant, and a camera. A user may define what "initially inserting" means (e.g.; the first time ever, the first time within a user-definable period such as the first time today, the first time within the last n hours, etc.).

The second step 22 of the method is checking for the presence of the SIM card in the user-definable electronic device. In the preferred embodiment, detecting when a SIM card has been initially inserted into the user-definable electronic device is comprised of a SIM card insertion detection method selected from the group of SIM card insertion detection methods comprising initially and successfully communicating from the user-definable electronic device to the SIM card, initially and successfully communicating from the SIM card to the user-definable electronic device, and verifying via an API that a flag in software in the user-definable electronic device indicates (e.g., is set to 1) that a SIM card is present in the user-definable electronic device.

The third step 23 of the method is if the SIM card is present in the user-definable electronic device then returning to the second step 22.

The fourth step 24 of the method is if the SIM card is not present in the user-definable electronic device then reporting that the SIM card has been removed from the user-definable electronic device. In the preferred method, the report is made via the user-definable electronic device (e.g., GUI) to a user of the user-definable electronic device. In an alternate method, the report is made to a remote monitor via a device (e.g., a computer, a phone, a personal digital assistant, etc.). In the preferred embodiment, detecting when a SIM card is not present in the user-definable electronic device is comprised of a SIM card absence detection method selected from the group of SIM card absence detection methods comprising unsuccessfully communicating from the user-definable electronic device to the SIM card, unsuccessfully communicating from the SIM card to the user-definable electronic device, and verifying via an API that a flag in software in the user-definable electronic device indicates (e.g., is set to 0) that a SIM card is not present in the user-definable electronic device.

The fifth step 25 of the method is checking for the presence of the SIM card in the user-definable electronic device. In the preferred embodiment, detecting when a SIM card is present in the user-definable electronic device is comprised of a SIM card insertion detection method selected from the group of SIM card insertion detection methods comprising successfully communicating from the user-definable electronic device to the SIM card, successfully communicating from the SIM card to the user-definable electronic device, and verifying via an API that a flag in software in the user-definable electronic device indicates (e.g., is set to 1) that a SIM card is present in the user-definable electronic device.

The sixth step 26 of the method is if the SIM card is not present in the electronic device then returning to the fifth step 25. In the preferred embodiment, detecting when a SIM card is not present in the user-definable electronic device is comprised of a SIM card absence detection method selected from the group of SIM card absence detection methods comprising unsuccessfully communicating from the user-definable electronic device to the SIM card, unsuccessfully communicating from the SIM card to the user-definable electronic device, and verifying via an API that a flag in software in the user-definable electronic device indicates (e.g., is set to 0) that a SIM card is not present in the user-definable electronic device.

The seventh step 27 of the method is if the SIM card is present in the electronic device then reporting that the SIM card has been reinserted into the electronic device, and returning to the second step 22. In the preferred method, the report is made via the user-definable electronic device (e.g., GUI) to a user of the user-definable electronic device. In an alternate method, the report is made to a remote monitor via a device (e.g., a computer, a phone, a personal digital assistant, etc.). In the preferred embodiment, detecting when a SIM card is present in the user-definable electronic device is comprised of a SIM card insertion detection method selected from the group of SIM card insertion detection methods comprising successfully communicating from the user-definable electronic device to the SIM card, successfully communicating from the SIM card to the user-definable electronic device, and verifying via an API that a flag in software in the user-definable electronic device indicates (e.g., is set to 1) that a SIM card is present in the user-definable electronic device.

What is claimed is:

1. A method of determining when a Subscriber Identity Module (SIM) card is removed and reinserted into a user-definable electronic device, comprising the steps of:
    (a) initially inserting the SIM card into the user-definable electronic device;
    (b) checking for the presence of the SIM card in the user-definable electronic device;
    (c) if the SIM card is present in the user-definable electronic device then returning to step (b);
    (d) if the SIM card is not present in the user-definable electronic device then reporting via a communication from the user-definable electronic device to a remote monitor of the user-definable electronic device that the SIM card has been removed;
    (e) checking for the presence of the SIM card in the user-definable electronic device;
    (f) if the SIM card is not present in the electronic device then returning, to step (e); and
    (g) if the SIM card is present in the electronic device then reporting that the SIM card has been reinserted into the electronic device, and returning to step (b).

2. The method of claim 1, wherein the step of if a SIM card is present in the user-definable electronic device then reporting that the SIM card has been reinserted into the user-definable electronic device in step (g) is comprised of the step of reporting via a communication from the user-definable electronic device to a remote monitor of the user-definable electronic device that the SIM card has been reinserted.

3. The method of claim 1, wherein the step of if the SIM card is present in the user-definable electronic device is comprised of the step of if the SIM card is present in the user-definable electronic device using a SIM card presence detection method selected from the group of SIM card presence detection methods comprising successfully communicating from the user-definable electronic device to the SIM card, successfully communicating from the SIM card to the user-definable electronic device, and verifying via an Application Programming Interface that an indicator in software in the user-definable electronic device indicates that a SIM card is present in the user-definable electronic device.

4. The method of claim 1, wherein the step of if the SIM card is not present in the user-definable electronic device is comprised of the step of if the SIM card is not present in the user-definable electronic device using a SIM card absence detection method selected from the group of SIM card absence detection methods comprising unsuccessfully communicating from the user-definable electronic device to the SIM card, unsuccessfully communicating from the SIM card to the user-definable electronic device, and verifying via an Application Programming Interface that an indicator in software in the user-definable electronic device indicates that a SIM card is not present in the user-definable electronic device.

5. The method of claim 1, wherein the step of if a SIM card is present in the user-definable electronic device then reporting that the SIM card has been reinserted into the user-definable electronic device in step (g) is comprised of the step of reporting via a communication from the user-definable electronic device to a remote monitor of the user-definable electronic device that the SIM card has been reinserted.

6. The method of claim 5, wherein the step of if the SIM card is present in the user-definable electronic device is comprised of the step of if the SIM card is present in the user-definable electronic device using a SIM card presence detection method selected from the group of SIM card presence detection methods comprising successfully communicating from the user-definable electronic device to the SIM card, successfully communicating from the SIM card to the user-definable electronic device, and verifying via an Application Programming Interface that an indicator in software in the user-definable electronic device indicates that a SIM card is present in the user-definable electronic device.

7. The method of claim 6, wherein the step of if the SIM card is not present in the user-definable electronic device is comprised of the step of if the SIM card is not present in the user-definable electronic device using a SIM card absence detection method selected from the group of SIM card absence detection methods comprising unsuccessfully communicating from the user-definable electronic device to the SIM card, unsuccessfully communicating from the SIM card to the user-definable electronic device, and verifying via an Application Programming Interface that an indicator in software in the user-definable electronic device indicates that a SIM card is not present in the user-definable electronic device.

* * * * *